US012292239B2

United States Patent
Lee et al.

(10) Patent No.: US 12,292,239 B2
(45) Date of Patent: *May 6, 2025

(54) DOUBLE TUBE FOR HEAT-EXCHANGE

(71) Applicant: ContiTech Fluid Korea Ltd., Jeonju-si (KR)

(72) Inventors: Kilnam Lee, Nonsan-si (KR); Steffen Hendrik, Cheonan-si (KR); Jonghoon Cha, Cheonan-si (KR); Jinwon Ko, Cheongju-si (KR); Ji Yeon Lee, Cheongju-si (KR); Hyunjin Im, Cheonan-si (KR); Sunphil Ga, Cheongju-si (KR)

(73) Assignee: ContiTech Fluid Korea Ltd., Jeonju-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/303,898

(22) Filed: Jun. 10, 2021

(65) Prior Publication Data

US 2022/0011050 A1 Jan. 13, 2022

Related U.S. Application Data

(63) Continuation of application No. 16/303,632, filed as application No. PCT/KR2017/005296 on May 22, 2017, now Pat. No. 11,060,795.

(30) Foreign Application Priority Data

May 20, 2016 (KR) ........................ 10-2016-0061878

(51) Int. Cl.
  *F28D 7/10* (2006.01)
  *F16L 41/02* (2006.01)
  (Continued)

(52) U.S. Cl.
  CPC ............ *F28D 7/106* (2013.01); *F16L 41/021* (2013.01); *F28D 7/024* (2013.01); *F28F 1/08* (2013.01);
  (Continued)

(58) Field of Classification Search
  CPC .. F28D 7/024; F28D 7/106; F28F 1/08; F28F 9/0248; F28F 2210/06; F28F 2265/26; F16L 41/021
  See application file for complete search history.

(56) References Cited

U.S. PATENT DOCUMENTS 3,828,851 A * 8/1974 Takayasu .............. F28D 9/0012
                                                        165/165
6,000,466 A   12/1999 Aoyagi et al.
  (Continued)

FOREIGN PATENT DOCUMENTS

DE         3206799 A1    11/1982
EP         2156948 A1     2/2010
  (Continued)

OTHER PUBLICATIONS

International Search report dated Aug. 2, 2017 of International Application PCT/KR2017/005296.

*Primary Examiner* — Devon Russell
(74) *Attorney, Agent, or Firm* — Gregory Adams; Richard Wolf

(57) ABSTRACT

Disclosed herein is a double tube for heat exchange. The double tube for heat exchange includes: a spiral pipe having ridges and valleys alternately formed on a circumferential surface thereof along a spiral track thereof and guiding a first fluid to flow therethrough; an outer pipe receiving the spiral pipe axially inserted thereinto and guiding a second fluid to flow along the circumferential surface of the spiral pipe in an axial direction such that the second fluid exchanges heat with the first fluid; and a resistance member protruding from (Continued)

the spiral pipe or the valleys to increase residence time of the second fluid in the valleys on the circumferential surface of the spiral pipe and to support the ridges adjacent thereto. Unlike typical double tubes, the double tube for heat exchange can improve heat exchange efficiency between a second fluid flowing inside an outer pipe and a fluid flowing inside a spiral pipe axially inserted into the outer pipe to increase residence time of the second fluid inside the outer pipe by virtue of a spiral shape of the spiral pipe; can improve flow directionality of the second fluid through formation of the grooves in valleys of the spiral pipe along a spiral track of the valleys; can reduce flow-induced noise through expansion of a space defined between an end joint of the outer pipe and the inner pipe to reduce the pressure of the second fluid; and further improve heat exchange efficiency through resistance members protruding from the valleys to increase residence time of the second fluid.

19 Claims, 8 Drawing Sheets

(51) Int. Cl.
  *F28D 7/02* (2006.01)
  *F28F 1/08* (2006.01)
  *F28F 9/02* (2006.01)
(52) U.S. Cl.
  CPC ........ *F28F 9/0248* (2013.01); *F28F 2210/06* (2013.01); *F28F 2265/26* (2013.01)

(56) References Cited

U.S. PATENT DOCUMENTS

| | | | |
|---|---|---|---|
| 9,091,487 B2 * | 7/2015 | Byon | ............... F28D 7/14 |
| 2003/0218332 A1 | 11/2003 | Takasaki et al. | |
| 2006/0005387 A1 | 1/2006 | Tase et al. | |
| 2008/0009564 A1 | 1/2008 | Robert et al. | |
| 2010/0036025 A1 | 2/2010 | Rodgers et al. | |
| 2010/0326640 A1 | 12/2010 | Tigashiyama et al. | |
| 2011/0126580 A1 | 6/2011 | Bae | |
| 2013/0025834 A1 * | 1/2013 | Choi | ............... F28F 1/40 |
| | | | 165/156 |
| 2013/0192804 A1 | 8/2013 | Matsuda et al. | |
| 2014/0109373 A1 | 4/2014 | Nakamura et al. | |
| 2015/0159957 A1 | 6/2015 | Baxi et al. | |
| 2015/0168074 A1 | 6/2015 | Bariar | |
| 2015/0240982 A1 * | 8/2015 | Eisner | ............... F16L 55/02772 |
| | | | 285/133.11 |
| 2016/0076682 A1 | 3/2016 | Conrad | |
| 2016/0216045 A1 | 7/2016 | Chan | |

FOREIGN PATENT DOCUMENTS

| | | | | |
|---|---|---|---|---|
| FR | 2925663 A1 * | 6/2009 | ......... | F02B 29/0462 |
| JP | H09113155 A | 5/1997 | | |
| JP | 2012127623 A | 7/2012 | | |
| KR | 20110104141 A | 9/2011 | | |
| KR | 20120007799 A | 1/2012 | | |
| KR | 20120132707 A | 12/2012 | | |
| KR | 101415738 B1 | 7/2014 | | |
| WO | 2009091490 A1 | 7/2009 | | |
| WO | 2011162771 A1 | 12/2011 | | |
| WO | 2013176712 A1 | 11/2013 | | |
| WO | 2017023563 A1 | 2/2017 | | |

* cited by examiner

[Fig. 1]
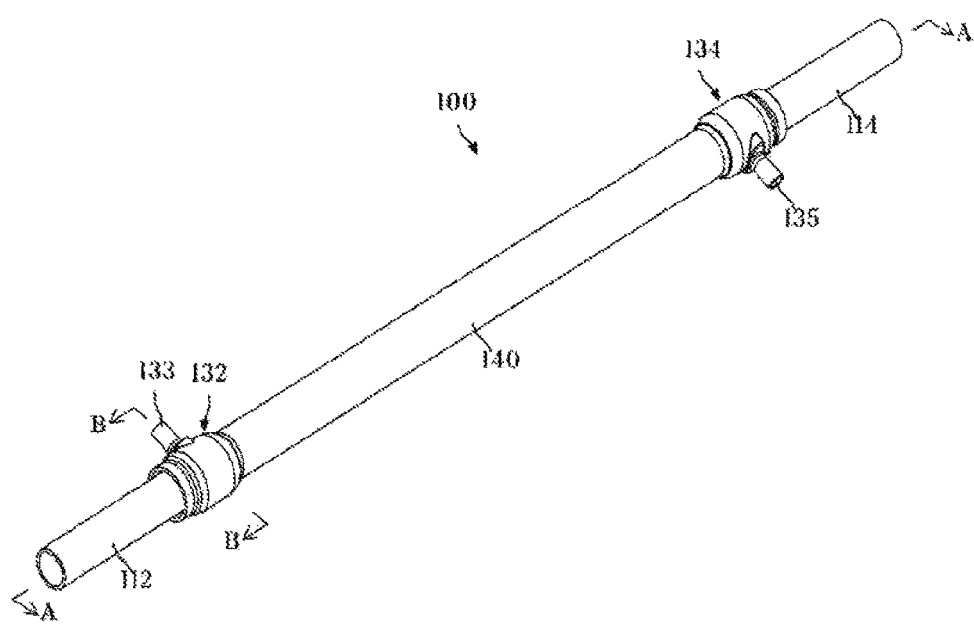

[Fig. 2]
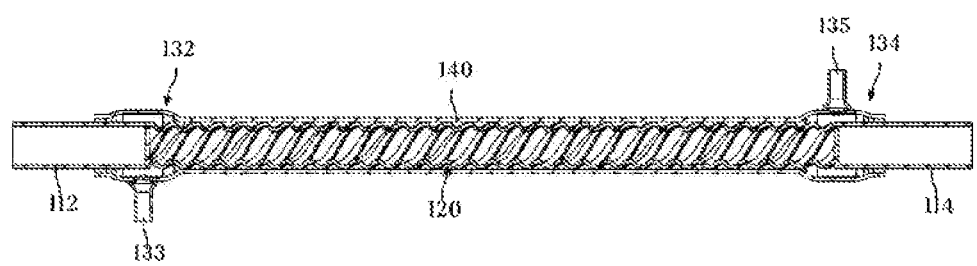

[Fig. 3]
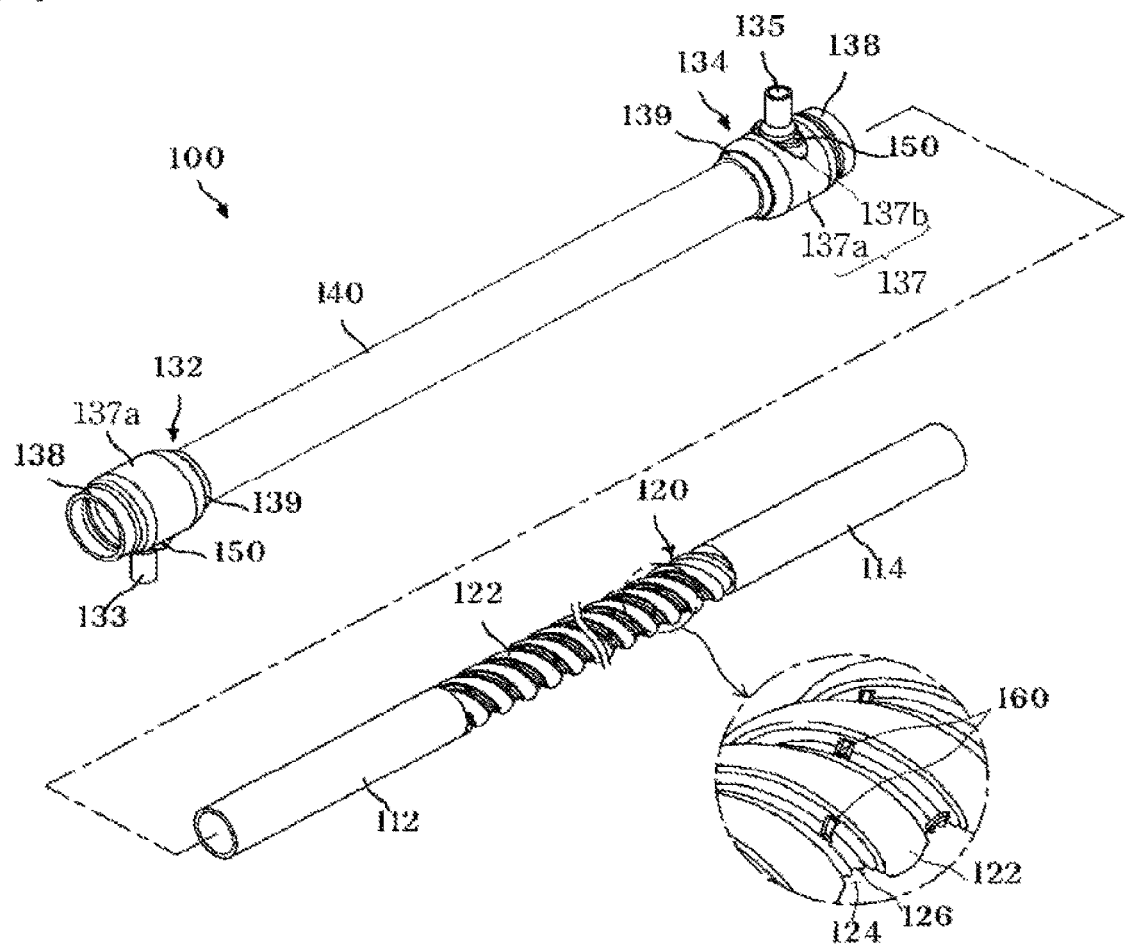

[Fig. 4]
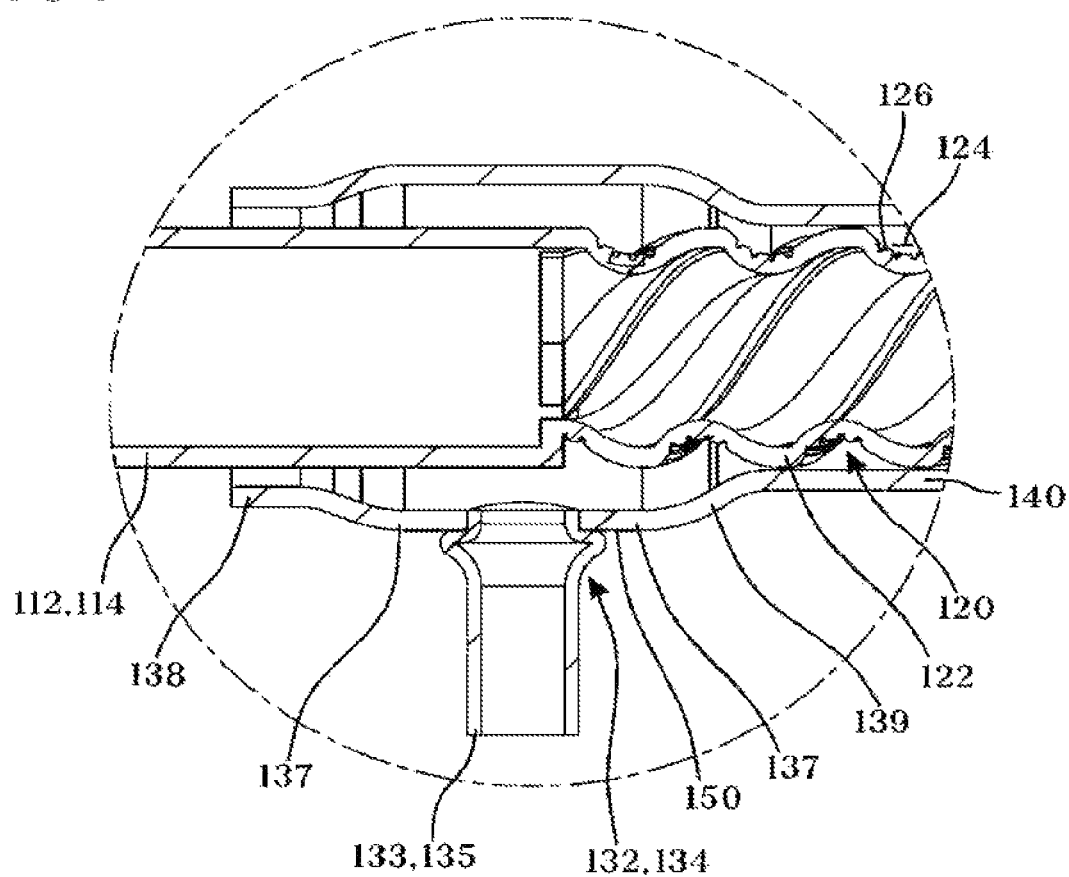

[Fig. 5]
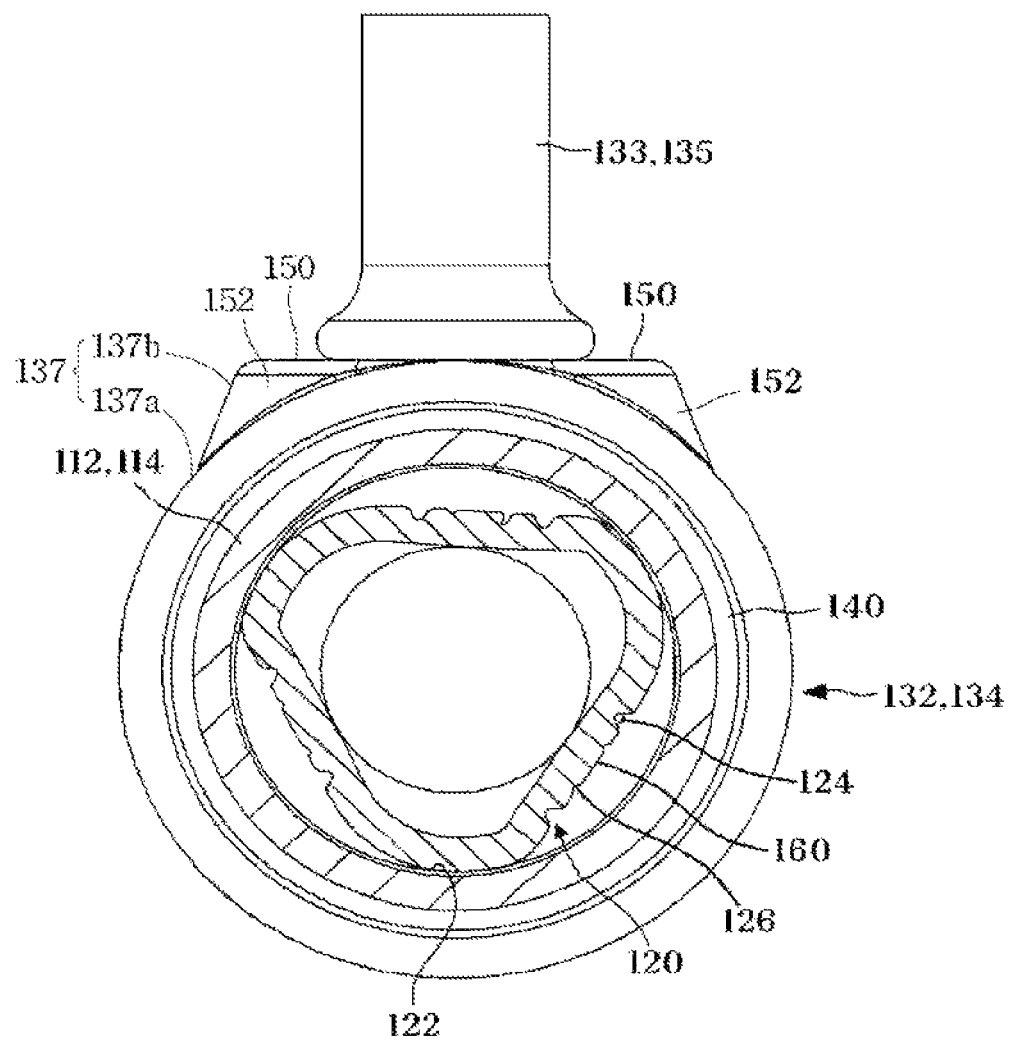

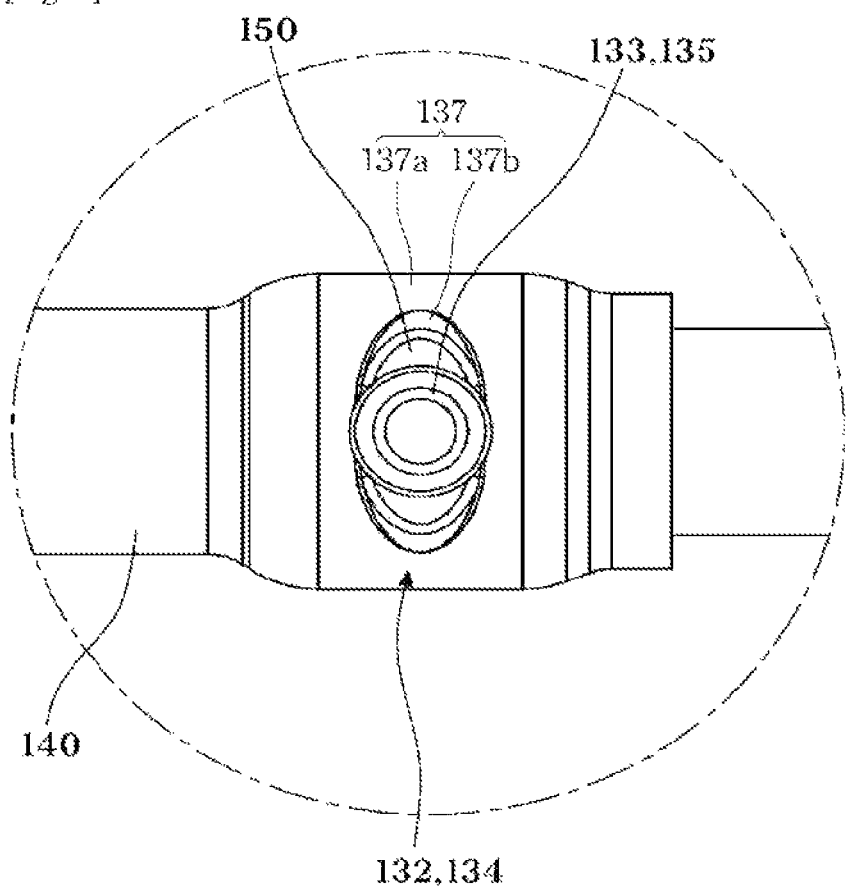
[Fig. 6]

[Fig. 7]
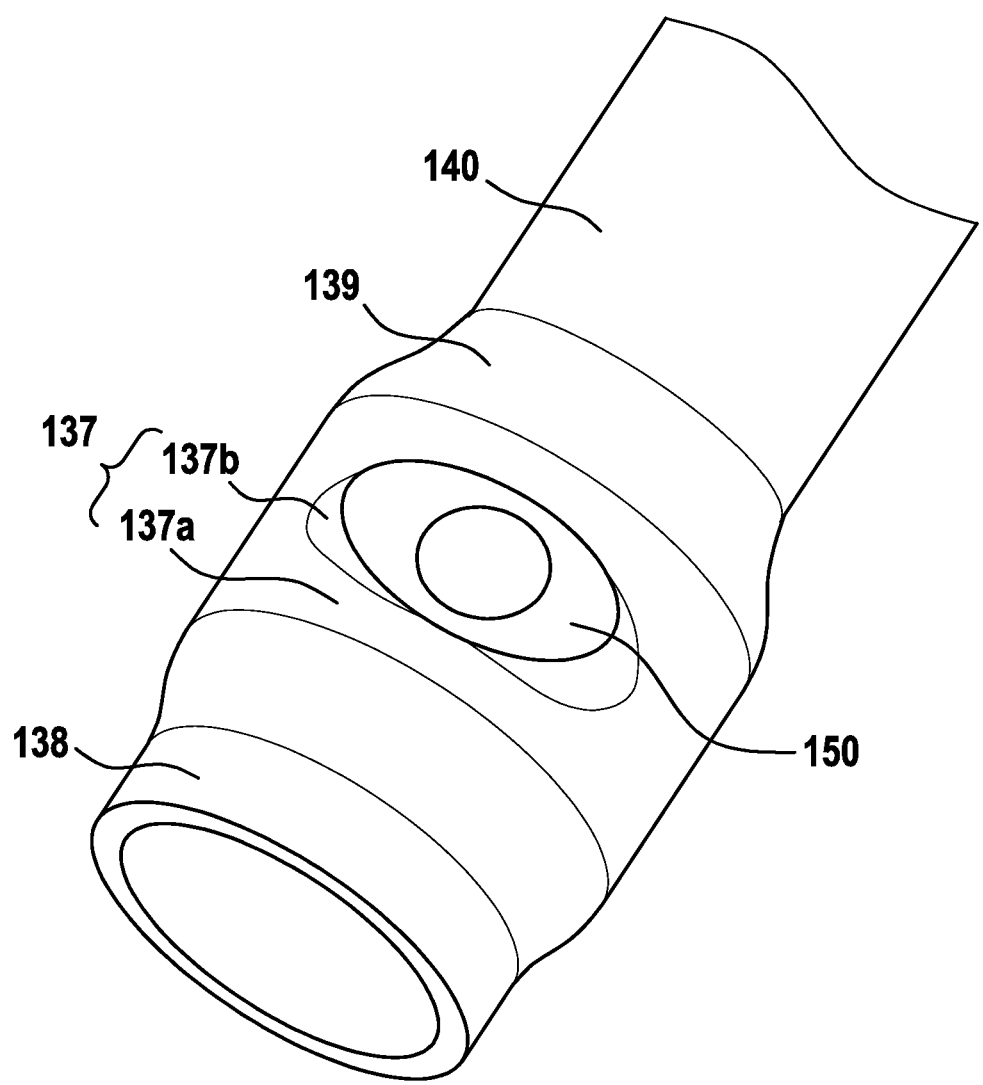

[Fig. 8]
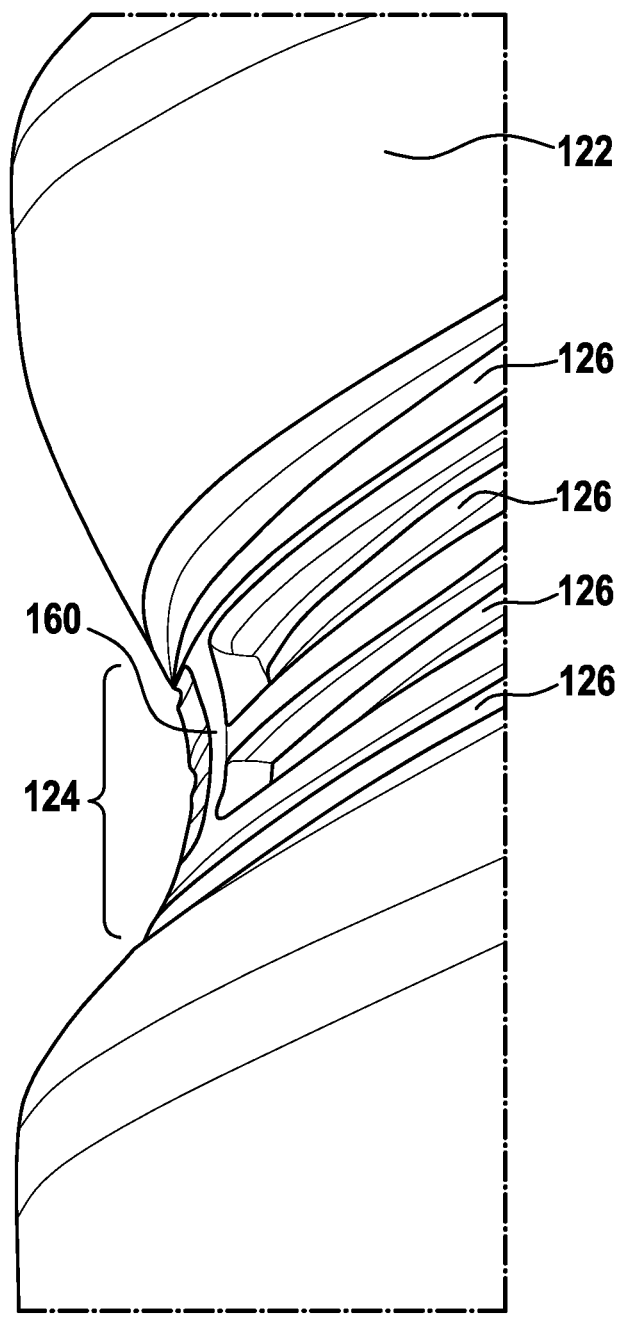

DOUBLE TUBE FOR HEAT-EXCHANGE

RELATED APPLICATION INFORMATION

This patent application is a Continuation of, and claims priority to U.S. Ser. No. 16/303,632 filed Nov. 20, 2018 as a National Stage Entry of PCT/KR2017/005296, filed on May 22, 2017, which is incorporated herein in its entirety, by reference. This patent application also claims priority to KR Patent Application No. 10-2016-0061878, filed on May 20, 2016, which is incorporated herein in its entirety, by reference.

TECHNICAL FIELD

The present invention generally relates to a double tube for heat exchange. More particularly, the present invention relates to a double tube for heat exchange, which can improve heat exchange efficiency between a second fluid and a first fluid flowing through a spiral pipe axially inserted into an outer pipe to increase a contact area between an outer surface of the spiral pipe and a second fluid flowing between the outer pipe and the spiral pipe; can improve flow directionality of the second fluid through formation of grooves in valleys of the spiral pipe along a spiral track thereof; can reduce flow-induced noise through expansion of a space between an end joint of the outer pipe and an inner pipe to reduce pressure of the second fluid; and can further improve heat exchange efficiency through resistance members protruding from valleys to increase residence time of the second fluid.

BACKGROUND

Generally, a double tube includes an inner pipe and an outer pipe surrounding an outer circumferential surface of the inner pipe to form a flow path between the outer pipe and the inner pipe. Such a double tube allows heat exchange between a first fluid flowing through the inner pipe and a second fluid flowing through the flow path between the inner pipe and the outer pipe.

Thus, the double tube may be used in a liquid supercooling system, which allows a low-temperature and low-pressure refrigerant at an outlet of an evaporator of an automotive air conditioner to exchange heat with a high-temperature and high-pressure refrigerant at an outlet of a condenser of the air conditioner to increase a supercooling degree of a refrigerant entering the evaporator, thereby improving cooling performance of the air conditioner. In such a liquid supercooling system, a refrigerant circulates in order of a compressor→a condenser→an expansion valve→an evaporator→a compressor, and a double tube is employed to allow a refrigerant at an outlet of the evaporator to exchange heat with a refrigerant at an outlet of the condenser (or at an inlet of the evaporator).

As one example of such a double tube, a double tube connection structure is disclosed in Korean Patent Publication No. 10-2012-0007799 A.

A typical double tube for heat exchange has a problem in that the double tube cannot secure a sufficient heat transfer area during flow of the second fluid and thus exhibits poor heat exchange efficiency. In order to overcome this problem, there has been proposed a method in which an inner pipe is formed in a spiral shape to increase a heat transfer area to improve heat exchange efficiency. However, there is a limitation in improvement in heat exchange efficiency by this method.

Therefore, there is a need for an improved double tube.

SUMMARY

Embodiments of the present invention have been conceived to solve such a problem in the art and it is one aspect of the present invention to provide a double tube for heat exchange which includes a spiral pipe axially inserted into an outer pipe to increase residence time of a second fluid inside the outer pipe by virtue of a spiral shape of the spiral pipe, thereby improving heat exchange efficiency.

It is another aspect of the present invention to provide a double tube for heat exchange which includes at least one groove formed on a circumferential surface of a spiral pipe along a spiral track of valleys to improve flow directionality of a second fluid so as to allow the second fluid to flow more stably, thereby further improving heat exchange efficiency.

It is a further aspect of the present invention to provide a double tube for heat exchange which has increased diameters of joints at both ends of an outer pipe to expand a space between the outer pipe and an inner pipe so as to reduce pressure of a fluid during inflow and outflow of the fluid, thereby reducing flow-induced noise.

It is yet another aspect of the present invention to provide a double tube for heat exchange which includes resistance members protruding from valleys of a spiral pipe to increase residence time of a second fluid, thereby further improving heat exchange efficiency.

It is yet another aspect of the present invention to provide a double tube for heat exchange which includes resistance members adjacent to ridges of a spiral pipe to prevent warpage of ridges of the spiral pipe, thereby improving durability of a spiral pipe.

In accordance with one aspect of the present invention, a double tube for heat exchange includes: a spiral pipe having ridges and valleys alternately formed on a circumferential surface thereof along a spiral track thereof and guiding a first fluid to flow therethrough; an outer pipe receiving the spiral pipe axially inserted thereinto and guiding a second fluid to flow along the circumferential surface of the spiral pipe in an axial direction such that the second fluid exchanges heat with the first fluid; and a resistance member protruding from the spiral pipe or the valleys to increase residence time of the second fluid in the valleys on the circumferential surface of the spiral pipe and to support the ridges adjacent thereto.

The double tube for heat exchange may further include: inner pipes connected to opposite sides of the spiral pipe to allow the first fluid to flow therethrough; and pipe expansion joints provided at opposite sides of the outer pipe to have a greater diameter than the outer pipe to be placed at junctions of the spiral pipe and the inner pipes, the pipe expansion joints being sealed against the corresponding pipe of the inner pipes and provided with ports for introducing and discharging the second fluid, respectively.

Each of the valleys may have at least one groove formed along a spiral track thereof to improve flow directionality of the second fluid and to increase a contact area between the second fluid and the spiral pipe.

Each of the pipe expansion joints may have a flattened portion formed by flattening a curved circumferential surface of a pipe expansion portion to create a space expansion portion inside the flattened portion and to improve weldability of the ports.

BRIEF DESCRIPTION OF THE DRAWINGS

The above and other aspects, features and advantages of the present invention will become apparent from the following description of embodiments given in conjunction with the accompanying drawings, in which:

FIG. 1 is a perspective view of a double tube for heat exchange according to one embodiment of the present invention;

FIG. 2 is an exploded perspective view of the double tube for heat exchange according to one embodiment of the present invention;

FIG. 3 is a sectional view taken along A-A line of FIG. 1;

FIG. 4 is an enlarged view of a main section of FIG. 3;

FIG. 5 is a sectional view taken along B-B line of FIG. 1; and

FIG. 6 is a plan view of a flattened portion according to one embodiment of the present invention.

FIG. 7 is another view of a double tube for heat exchange.

FIG. 8 is another view of a double tube for heat exchange.

DETAILED DESCRIPTION

Hereinafter, embodiments of the present invention will be described in detail with reference to the accompanying drawings. It should be noted that the drawings are not to precise scale and may be exaggerated in thicknesses of lines or sizes of components for descriptive convenience and clarity only. In addition, the terms used herein are defined by taking functions of the present invention into account and can be changed according to user or operator custom or intention. Therefore, definition of the terms should be made according to the overall disclosure set forth herein.

FIG. 1 is a perspective view of a double tube for heat exchange according to one embodiment of the present invention, and FIG. 2 is an exploded perspective view of the double tube for heat exchange according to one embodiment of the present invention.

FIG. 3 is a sectional view taken along A-A line of FIG. 1, FIG. 4 is an enlarged view of a main section of FIG. 3, and FIG. 5 is a sectional view taken along B-B line of FIG. 1.

FIG. 6 is a plan view of a flattened portion according to one embodiment of the present invention.

Referring to FIGS. 1 to 6, a double tube for heat exchange 100 according to one embodiment of the present invention includes inner pipes 112,114, a spiral pipe 120, pipe expansion joints 132,134, and an outer pipe 140.

The double tube for heat exchange 100 according to the present invention allows heat exchange between a refrigerant (first fluid) at an outlet of an evaporator of an automotive air conditioner and a refrigerant (second fluid) at an outlet of a condenser of the air conditioner to reduce load of the compressor through increase in temperature of the first fluid introduced into a compressor, while improving vaporization efficiency through decrease in temperature of the second fluid introduced into an expansion valve.

Particularly, the outer pipe 140 has a tubular shape and allows a high-temperature and high-pressure fluid (the second fluid) at the outlet of the condenser to flow therethrough.

The inner pipes 112, 114 have a tubular shape, allow a low-temperature and low-pressure fluid (the first fluid) at the outlet of the evaporator to flow therethrough, and are inserted into the outer pipe 140.

Thus, the second fluid at high temperature and high pressure at the outlet of the condenser flows through a space between the inner pipes 112, 114 and the outer pipe 140.

That is, the double tube for heat exchange 100 according to the present invention allows heat exchange between the first fluid at low temperature and low pressure at the outlet of the evaporator and the second fluid at high temperature and high pressure at the outlet of the condenser through the inner pipes 112, 114.

In addition, the spiral pipe 120 connects the inner pipes 112, 114 to each other and is formed on a circumferential surface thereof with ridges 122 and valleys 124 in an alternating manner along a spiral track thereof.

Further, the spiral pipe 120 is connected at opposite sides thereof to the inner pipes 112, 114. In other words, a first inner pipe 112 is connected to one side of the spiral pipe 120 and the second inner pipe 114 is connected to the other side of the spiral pipe 120. It should be understood that the spiral pipe 120 may be formed at a portion of the first inner pipe 112 or a portion of the second inner pipe 114. Thus, the first fluid flows through the first inner pipe 112, the spiral pipe 120, and the second inner pipe 114.

Particularly, the spiral pipe 120 is formed with the ridges 122 and the valleys 124 in an alternating manner. Since the second fluid flows along the valleys 124 of the circumferential surface of the spiral pipe 120, residence time of the second fluid in the outer pipe 140 and the spiral pipe 120 is increased, thereby improving heat exchange efficiency between the second fluid and the first fluid.

In addition, the ridges 122 of the spiral pipe 120 may consecutively adjoin an inner surface of the outer pipe 140. As a result, the second fluid is allowed to flow along the valleys 124 of the spiral pipe 120.

Here, the ridges 122 consecutively adjoin the inner surface of the outer pipe 140 such that the second fluid can stably flow in a particular direction.

The pipe expansion joints 132, 134 are placed at junctions between the inner pipes 112, 114 and the spiral pipe 120, respectively. The pipe expansion joints 132, 134 are sealed against a circumferential surface of the corresponding pipe of the inner pipes 112, 114 and are provided with ports 133, 135 for inflow/outflow of the second fluid, respectively.

In other words, a first pipe expansion joint 132 covers a junction between the first inner pipe 112 and the spiral pipe 120, and a second pipe expansion joint 134 covers a junction between the second inner pipe 114 and the spiral pipe 120.

The first pipe expansion joint 132 is sealed along a circumferential surface of the first inner pipe 112 by welding and the like. The second pipe expansion joint 134 is sealed along a circumferential surface of the second inner pipe 114 by welding and the like.

The first pipe expansion joint 132 and the second pipe expansion joint 134 are connected to the outer pipe 140. Here, the outer pipe 140 may be integrally formed with the first pipe expansion joint 132 at one side thereof and be integrally formed with the second pipe expansion joint 134 at the other side thereof.

It should be understood that the first pipe expansion joint 132 and the second pipe expansion joint 134 may also be connected to the outer pipe 140 by welding and the like.

As such, the outer pipe 140 is configured to surround the entire spiral pipe 120.

In addition, the first pipe expansion joint 132 has a first port 133 for receiving the second fluid at high temperature and high pressure from the outlet of the condenser, and the second pipe expansion joint 134 has a second port 135 for discharging the heat exchanged second fluid to the expansion valve.

Thus, the second fluid introduced through the first port 133 flows along the valleys 124 in a space between the outer pipe 140 and the spiral pipe 120 and is then discharged through the second port 135.

Here, the second fluid exchanges heat with the first fluid that flows along the first inner pipe 112, the spiral pipe 120, and the second inner pipe 114. That is, the first fluid is heated through heat exchange with the second fluid, and the second fluid is cooled through heat exchange with the first fluid.

Thus, the inner pipes 112, 114, the spiral pipe 120, and the outer pipe 140 may be formed of a material having high thermal conductivity.

The first pipe expansion joint 132 and the second pipe expansion joint 134 have the same shape to be interchangeable with each other. Here, each of the first pipe expansion joint 132 and the second pipe expansion joint 134 includes a pipe expansion portion 137, a packing member 138, and a connection member 139.

The pipe expansion portion 137 has a greater diameter than the outer pipe 140 so as to reduce flow noise of the second fluid. Here, the pipe expansion portions 137 are configured to surround a junction between the first inner pipe 112 and the spiral pipe 120 and a junction between the second inner pipe 114 and the spiral pipe 120, respectively. It should be understood that the pipe expansion portions 137 may also be placed at both sides in an axial direction of the spiral pipe 120.

In addition, the pipe expansion portion 137 has a greater diameter than the outer pipe 140.

That is, a space between the pipe expansion portion 137 and the spiral pipe 120 is expanded, whereby the transfer pressure and transfer rate of the second fluid can be reduced when the second fluid is introduced through the first port 133 of the pipe expansion portion 137, thereby reducing flow-induced noise.

In addition, since the space between the pipe expansion portion 137 and the spiral pipe 120 is expanded, transient storage capacity for the second fluid is increased just before the second fluid is discharged through the second port 135 of the pipe expansion portion 137, thereby stably securing a sufficient discharge amount.

Further, the packing member 138 is tapered from one side of the pipe expansion portion 137 and is connected to the circumferential surface of the corresponding pipe of the first inner pipe 112 and the second inner pipe 114 to be packed on the surface. Particularly, since the packing member 138 is downwardly tapered from the pipe expansion portion 137, flow resistance of the second fluid can be reduced, thereby reducing flow-induced noise.

Moreover, the connection member 137 is tapered from the other side of the pipe expansion portion 137 and connected to the outer pipe 140. Here, the connection member 139 is sealed at an edge thereof against a corresponding edge of the outer pipe 140 by welding and the like. Since the connection member 139 is downwardly tapered from the pipe expansion portion 137, flow resistance of the second fluid can be reduced, thereby reducing flow-induced noise.

As described above, thee second fluid stably flows along the valleys 124 in a particular direction. In order to allow the second fluid to flow more stably, each of the valleys 124 is provided with at least one groove 126 along a spiral track of the valley 124.

Particularly, a plurality of grooves 126 is formed to be parallel to one another in order to improve flow directionality of the second fluid while increasing a contact area between the second fluid and the spiral pipe 120.

Here, the groove 126 is not particularly limited in terms of shape, number, and height.

By a flattening process, each of the pipe expansion joints 132, 134 may be formed with a flattened portion 150 at a portion of the curved circumferential surface thereof at which the corresponding pipe of the first port 133 and the second port 135 is formed.

The flattened portion 150 is formed by flattening the circumferential surfaces of the pipe expansion joints 132, 134 along the peripheries of the first port 133 and the second port 135 such that the first port 133 and the second port 135 can be easily coupled to the pipe expansion joints 132, 134, respectively, by welding and the like.

In other words, the first port 133 and the second port 135 may be partially inserted into the corresponding pipe of the pipe expansion joints 132, 134 and then welded by two-dimensionally moving a welding jig (not shown) on the flattened portion 150, thereby allowing easy welding while preventing welding defects.

By providing the flattened portion 150, a space expansion portion 152 can be naturally created inside the pipe expansion portion 137. It should be understood that the space expansion portion 152 may also be separately formed in an inner surface of each of the pipe expansion joints 132, 134.

The space expansion portion 152 can further reduce flow resistance of the second fluid, thus reducing flow-induced noise. It should be understood that the flattened portion 150 may be machined using various jigs.

Heat exchange performance can be controlled by increasing/reducing the pitch between adjacent valleys 124 or between adjacent ridges 122 of the spiral pipe 120.

Particularly, as the number of grooves 126 of the valley 124 is increased, the distance between the ridge 122 and the outer pipe 140 decreases or the width of the ridge 122 increases in the circumferential direction of the outer pipe 140, thereby reducing flow-induced noise.

As the distance between the ridge portion 122 and the outer pipe 140 or the width of the ridge portion 122 is increased, noise reduction is further improved. However, increase in width of the ridge 122 with increasing distance between the ridge 122 and the outer pipe 140 can cause increased pressure loss in a flow path or re-expansion of the second fluid when the second fluid at high temperature and high pressure flows through the valleys 124. Thus, it is necessary to appropriately adjust a ratio of a sectional area of a flow path for the second fluid to the distance between the ridge portion 122 and the outer pipe.

In addition, a resistance member 160 may protrude from the valley 124. The resistance member 160 protrudes between adjacent ridges 122 and is not limited in terms of shape and number.

The resistance member 160 serves to increase the residence time of the second fluid in the valleys 124 while supporting the ridges 122 adjacent thereto.

It should be understood that the distance of adjacent resistance members 160 is not particularly limited.

Here, the spiral pipe 120 is formed with the valleys 124 and the grooves 126 along the spiral track thereof in a discontinuous manner such that the resistance members 160 can be naturally formed. Particularly, the resistance member 160 needs to have a smaller height than the ridge portion 122 to allow flow of the second fluid.

Thus, the resistance member 160 may be partially chamfered at an upper portion thereof. It should be understood that the resistance member 160 may be formed in various shapes.

According to the present invention, the double tube for heat exchange includes the spiral pipe axially inserted into the outer pipe to increase residence time of a second fluid inside the outer pipe, thereby improving heat exchange efficiency between the second fluid flowing between the outer pipe and the spiral pipe and a first fluid flowing through the spiral pipe.

In addition, according to the present invention, the double tube for heat exchange includes at least one groove formed on the circumferential surface of the spiral pipe along the spiral track of the valleys to improve flow directionality of the second fluid so as to allow the second fluid to flow more stably, thereby further improving heat exchange efficiency.

Further, according to the present invention, the double tube for heat exchange has increased diameters of pipe expansion joints connecting outer pipes to each other to expand a space between the outer pipe and the inner pipe so as to reduce pressure of a fluid during inflow and outflow of the fluid, thereby reducing flow-induced noise.

Furthermore, according to the present invention, the double tube for heat exchange can improve durability of a spiral pipe by preventing warpage of ridges of the spiral pipe through the resistance member adjacent to the ridges.

Although some embodiments have been described herein, it should be understood that these embodiments are provided for illustration only and are not to be construed in any way as limiting the present invention, and that various modifications, changes, and alterations can be made by those skilled in the art without departing from the spirit and scope of the invention. Therefore, the scope of the present invention should be defined by the appended claims and equivalents thereof.

DESCRIPTION OF REFERENCE NUMERALS

100: Double tube
112, 114: First and second inner pipes
120: Spiral pipe
122: Ridge portion
124: Valley
126: Groove
132, 134: First and second pipe expansion joints
133, 135: First and second ports
137: Pipe expansion portion
138: Packing member
139: Connection member
140: Outer pipe
150: Flattened portion
152: Space expansion portion
160: Resistance member

What is claimed is:

1. A double tube for heat exchange, the double tube comprising:
a spiral pipe having ridges and valleys alternately formed on a circumferential surface thereof along a spiral track thereof and guiding a first fluid to flow therethrough;
an outer pipe receiving the spiral pipe axially inserted thereinto and guiding a second fluid to flow along the circumferential surface of the spiral pipe in an axial direction such that the second fluid exchanges heat with the first fluid;
a first pipe expansion joint coupled to a first end of the spiral pipe and the outer pipe;
a second pipe expansion joint coupled to a second end of the spiral pipe and the outer pipe;
the first pipe expansion joint having a flattened portion formed by flattening a curved circumferential surface of the first inner pipe expansion joint, the flattened portion configured to facilitate weldability;
a first port for the second fluid and the first port is welded on the flattened portion of the first inner pipe expansion joint, the first port configured to receive the second fluid as a high temperature and high pressure fluid;
a second port for the second fluid and attached to the second inner pipe expansion joint, the second port configured to discharge the second fluid as heat exchanged second fluid;
the flattened portion creates a space expansion portion separately formed in an inner surface of the first pipe expansion joint to mitigate welding defects and reduce flow-induced noise;
a plurality of resistance members; and
wherein a resistance member of the plurality of resistance members is formed across a plurality of valleys.

2. The double tube of claim 1, wherein each of the pipe expansion joints has a flattened portion formed by flattening a curved circumferential surface of a pipe expansion portion to create a space expansion portion inside the flattened portion and to improve weldability of the ports.

3. The double tube of claim 1, further comprising first and second inner pipes configured to allow the first fluid to flow therethrough.

4. The double tube of claim 1, the first and second pipe expansion joints configured to have a greater diameter than the outer pipe.

5. The double tube of claim 1, the first and second pipe expansion joints being sealed against the corresponding pipe of the inner pipes and the first and second ports for introducing and discharging the second fluid, respectively.

6. The double tube of claim 1, the circumferential surface of the spiral pipe having at least one groove formed along a spiral track thereof to improve flow directionality of the second fluid and to increase a contact area between the second fluid and the spiral pipe.

7. The double tube of claim 6, the at least one groove is configured to increase residence time of the second fluid in the outer pipe.

8. The double tube of claim 7, the at least one groove comprises four grooves.

9. The double tube of claim 1, the first port configured for inflow of the second fluid and the second port configured for outflow of the second fluid.

10. The double tube of claim 1, the second fluid coming from a condenser at a relatively high temperature and high pressure and at a higher temperature than the first fluid.

11. The double tube of claim 1, the outer tube configured to completely surround the spiral pipe.

12. The double tube of claim 1, the second pipe expansion joint having an expansion portion with an expanded space between second pipe expansion and the spiral pipe to reduce transfer pressure and transfer rate of the second fluid through the second port to reduce flow-induced noise.

13. The double tube of claim 1, further comprising a plurality of resistance members formed in the valleys of the spiral tube.

14. The double tube of claim 13, the plurality of resistance members having a chamfered upper portion.

15. The double tube of claim 1, the valleys comprise a plurality of grooves.

16. A double tube for heat exchange, comprising:
a spiral pipe having ridges and valleys alternately formed on a circumferential surface thereof along a spiral track thereof and guiding a first fluid to flow therethrough;
an outer pipe receiving the spiral pipe axially inserted thereinto and guiding a second fluid to flow along the circumferential surface of the spiral pipe in an axial direction such that the second fluid exchanges heat with the first fluid;

inner pipes (connected to opposite sides of the spiral pipe to allow the first fluid to flow therethrough; and pipe expansion joints provided at opposite sides of the outer pipe to have a greater diameter than the outer pipe to be placed at junctions of the spiral pipe and the inner pipes, pipe expansion joints being sealed against the corresponding pipe of the inner pipes and provided with ports for introducing and discharging the second fluid, respectively, wherein the pipe expansion joints include pipe expansion portions having a greater diameter than the outer pipe and integrally connected to the outer pipe, wherein each of the valleys has at least three grooves formed along the spiral track, and wherein a resistance member is protruded at least partially over the remaining grooves except for two grooves located outside among the at least three grooves.

17. The double tube of claim 16, wherein the first fluid is a refrigerant.

18. The double tube of claim 16, wherein the first fluid is at a lower pressure than the second fluid.

19. The double tube of claim 16, wherein each of the pipe expansion joints has a flattened portion.

\* \* \* \* \*